United States Patent
Oida

(10) Patent No.: US 6,429,997 B1
(45) Date of Patent: Aug. 6, 2002

(54) SPEED PROFILE SELECTING MEANS FOR A RECORDING AND REPRODUCING APPARATUS

(75) Inventor: Nobuyuki Oida, Tokorozawa (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/282,740

(22) Filed: Mar. 31, 1999

(30) Foreign Application Priority Data

Apr. 2, 1998 (JP) .............................. 10-89749

(51) Int. Cl.[7] .............................................. G11B 5/596
(52) U.S. Cl. ................................................ 360/78.07
(58) Field of Search .............................. 360/78.07, 75, 360/78.01; 369/44, 28, 44.29, 44.32

(56) References Cited

U.S. PATENT DOCUMENTS

| 5,465,183 A | * | 11/1995 | Hattori | 360/78.9 |
| 5,475,545 A | * | 12/1995 | Hampshire et al. | 360/78.06 |
| 5,760,992 A | * | 6/1998 | Phan et al. | 360/78.07 |
| 6,046,878 A | * | 4/2000 | Liu et al. | 360/75 |

FOREIGN PATENT DOCUMENTS

| JP | 1-220233 | 9/1989 |
| JP | 1-296434 | 11/1989 |
| JP | 6-60394 | 3/1994 |

* cited by examiner

Primary Examiner—David Hudspeth
Assistant Examiner—K Wong
(74) Attorney, Agent, or Firm—Anderson Kill & Olick, P.C.; Eugene Lieberstein; Michael N. Meller

(57) ABSTRACT

A disk device has a head for recording and reproducing data to and from a disk-shaped recording medium. A carriage for supporting the head is provided. A driver is included for moving the carriage in the direction of a radius of the disk-shaped recording medium. Also provided is a controller controlling the driver based on a speed profile selected from among a plurality of preset speed profiles. The speed profile is selected in response to values stored in a memory indicating a disturbance to the head.

5 Claims, 8 Drawing Sheets

SPEED PROFILE SELECTING MEANS FOR A RECORDING AND REPRODUCING APPARATUS

BACKGROUND OF THE INVENTION

1. Field of the Invention

The present invention relates generally to a disk device, and more particularly, to a disk device for recording and playing data to and from a desired track on a disk.

2. Description of the Related Art

As data capacity has increased in recent years a high-capacity recording medium for providing data has become more desirable. A high-capacity floppy disk, for example, has already been developed as one such high-capacity recording medium. The high-capacity floppy disk can be recorded and played using magnetism alone and can therefore be used together with ordinary floppy disks, making the high-capacity floppy disk a popular choice for a recording medium.

A disk drive used to record and play data to and from these types of high-capacity floppy disks comprises a head carriage for which a mode of seeking a particular track on the disk is controlled in such a way that a graphical depiction of the speed with which the carriage moves when seeking a particular track assumes the shape of a table or plateau. Examples of such a seek mode speed profile, hereinafter referred to as a speed profile, are shown in FIG. 7 and FIG. 8. The speed profile is generally such that the head carriage accelerates until it attains a maximum speed Vmax, at which point the head carriage thereafter maintains this maximum speed Vmax until decelerating upon approach to the target track.

However, the speed profile of the head carriage differs depending on the distance from a current track, that is, a current address, to a target track, that is, a target address.

Assuming, for the sake of illustration, that a distance from a current track to a target track is a relatively long distance, then the speed profile of the head carriage as it moves from the current track to the target track is such that at a time t0 to a time t2 the head carriage accelerates until it attains a maximum speed Vmax, at a time t2 to t4 the head carriage moves at this constant maximum speed Vmax and at a time t4 to t5 the head carriage decelerates, forming the roughly plateau-like speed profile shown in FIG. 7 and FIG. 8.

However, if the distance from a current track to a target track is a relatively short distance, then the speed profile of the head carriage as it moves from the current track to the target track is such that at a time t0 to a time t1 the head carriage accelerates and from a time t1 to t3 the head carriage decelerates, without attaining a maximum speed Vmax. Accordingly, the speed profile resembles a triangle as shown in FIG. 7.

A description will now be given of a formula for obtaining the speed profile shown in FIG. 7.

If the target speed during acceleration is Va, the head carriage acceleration time determined from the propulsive force of an actuator that moves the head carriage and the mass of the head carriage is $\alpha a$ and the head carriage movement distance is x, then $$Va = \sqrt{(2 \cdot \alpha a \cdot x)} \quad (1)$$

Additionally, if the target speed during deceleration is Vd, the speed of the head carriage when deceleration commences is Vd0, the acceleration at deceleration as determined from the propulsive force of an actuator for moving the head carriage and the mass of the head carriage is $\alpha d$, the movement distance of the head carriage from the current track to the target track is x and the position at which deceleration commences is xd, then the target speed at deceleration can be determined by $$Vd = Vd0 - \sqrt{\{(2 \cdot \alpha d \cdot (x - xd)\}} \quad (2)$$

A speed profile like that shown in FIG. 7 is produced from formulas (1) and (2) as described above.

It should be noted that the above-described speed profile can be disrupted, that is, errors in the movement of the head carriage can occur, due to disturbance of the head carriage. As can be appreciated, such movement errors can affect the accuracy with which data is written to and read from a disk.

As methods for correcting movement errors due to disturbance of the head carriage, Japanese Laid-Open Patent Application Nos. 1-220233, 1-296434 and 6-60394 have been proposed.

Japanese Laid-Open Patent Application No. 1-220233 describes a device for recording and playing optical data that detects an inclination angle of the head carriage by an inclination angle detector and applies an offset electric current to a voice coil of a voice coil-type linear motor according to the results of that detection.

Further, Japanese Laid-Open Patent Application No. 1-296434 describes a device for recording and playing optical data by determining an acceleration caused by the inclination of the head and adding an offset current that imparts a propulsive force in a direction that negates that acceleration to a drive current of a voice coil.

Japanese Laid-Open Patent Application No. 6-60394 describes an optical disk drive device that provides means for detecting an angle of inclination in a direction of movement of a carriage and switches a carriage control system gain according to an angle of inclination shown by an output signal from the inclination angle detection means.

However, with the conventional disk device, the disk device is set horizontally and, without taking into account the effects of friction, the acceleration $\alpha$ can be obtained by $$\alpha = F/M \quad (3)$$

where F is the propulsive force of the actuator and M is the mass of the head carriage.

However, when the disk device is set at an incline, the force of gravity is dispersed horizontally and affects the movement of the head carriage.

FIG. 9 describes a component of force in the horizontal direction when the disk device is set at an incline. As shown in FIG. 9, when the drive unit is inclined in the direction of the seek the effect of gravity is exerted in the seek direction. If gravitational acceleration is g, head carriage mass M, the inclination angle $\theta$ and the actuator propulsive force F, then the acceleration $\alpha d$ can be found by $$\alpha d = (F - M \cdot g \cdot \sin \theta)/M \quad (4)$$

As can be readily appreciated, acceleration $\alpha d$ is smaller than an acceleration $\alpha$ set when creating the target speed profile. As a result, an acceleration at deceleration, that is, a negative acceleration, is inadequate when seeking an appropriate track at a speed profile determined according to formula (2). Thus the actual head carriage speed at deceleration as indicated by the dotted line shown in FIG. 8 is unable to trace the target speed profile and, as a result, the head carriage arrives at the target track without being able to fully decelerate.

It should be noted that a switch is made from a speed control mode to a position control mode when the head carriage arrives at the target track. If this switch to position control mode is made without the head carriage having fully decelerated, then the initial speed of the head carriage in the position control mode will be high and, as a result, the head carriage will greatly overshoot the target track, leading to poor settling and perhaps causing a seek error.

On the other hand, if the acceleration α is set to a smaller value when creating the target speed profile in consideration of formula (4) in order to prevent the occurrence of the above-described problem, then a gently accelerating and decelerating speed profile will occur even during normal use, when a force is not normally exerted on the head carriage in the seek direction, causing the seek time to increase. Additionally, similar problems occur due to changes caused by the temperature of the reaction force of the flexible substrate that connects the control substrate and the head carriage.

Further, the inventions of Application No. 1-220233, Application No. 1-296434 and Application No. 6-60394 have an inclination detector for detecting an inclination of the head carriage, thus complicating the structure of the disk device. Additionally, a further problem arises in that, depending on the manner in which the inclination detector is mounted, the inclination detector may not be able to accurately detect the inclination of the head carriage, making accurate positioning of the head carriage difficult.

SUMMARY OF THE INVENTION

Accordingly, it is an object of the present invention to provide a disk device in which the problems described above are eliminated.

Another and more specific object of the present invention is to provide a disk device of a simple structure that can accurately control the speed of the head carriage in accordance with the inclination of the head carriage.

The above-described objects of the present invention are achieved by a disk device comprising:

a head for recording and playing data to and from a disk-shaped recording medium;

a carriage for supporting the head;

drive means for moving the carriage in the direction of a radius of the disk-shaped recording medium; and control means for controlling the driving means based on a speed profile, wherein the disk device further comprises speed profile setting means for setting the speed profile to be used during speed control by the control means in response to the detection of a disturbance applied to the head carriage during tracking from the data played from the disk-shaped recording medium.

According to the present invention, by setting the speed profile to be used during speed control by the control means in response to the detection of a disturbance applied to the head carriage during tracking from the data played from the disk-shaped recording medium, it is possible to detect a disturbance affecting the head carriage without providing specialized detecting means, and thus it is possible to set a speed profile appropriate to a detected disturbance using a simple structure.

Additionally, the above-described objects of the present invention are also achieved by the disk device as described above, the control means comprising:

a comparator for comparing positional data obtained from the drive means with positional data of a target track; and an integrator for integrating an output value of the comparator, wherein the speed profile setting means detects the output value of the integrator as a disturbance imparted to the carriage.

According to the present invention, by detecting the output values of the integrator that controls tracking as disturbances imparted to the head carriage, it is possible to detect a disturbance affecting the head carriage without providing specialized detecting means, and thus it is possible to set a speed profile appropriate to a detected disturbance using a simple structure.

Further, the above-described objects of the present invention are also achieved by the disk device as described above, wherein the speed profile setting means comprises a memory for storing the output value of the integrator when the head is positioned above the track.

According to the present invention, by storing in memory a value of an integrator during tracking and using that value stored in memory when seeking a target track, it is possible, when controlling the speed, to set the speed profile using a value appropriate to a disturbance occurring during tracking.

Additionally, the above-described objects of the present invention are also achieved by the disk device as described above, wherein the speed profile setting means generates and sets a speed profile based on the value stored in the memory.

According to the present invention, by generating and setting a speed profile based on the value stored in the memory, it is possible, when controlling the speed, to set the speed profile using a value appropriate to a disturbance occurring during tracking.

Further, the above-described objects of the present invention are also achieved by the disk device as described above, wherein the speed profile setting means compares the value stored in the memory with a predetermined standard value and depending on the results of that comparison selects a corresponding speed profile from among a plurality of preset speed profiles.

According to the present invention, by comparing the value stored in the memory with a predetermined standard value and depending on the results of that comparison selecting a corresponding speed profile from among a plurality of preset speed profiles, computation becomes unnecessary and the setting of the speed profile is simplified.

Other objects, features and advantages of the present invention will become more apparent from the following detailed description when read in conjunction with the accompanying drawings.

DESCRIPTION OF THE PREFERRED EMBODIMENTS

A detailed description will now be given of a first embodiment of a disk device according to the present invention, with reference to FIG. 1 through FIG. 6.

Figure 1:
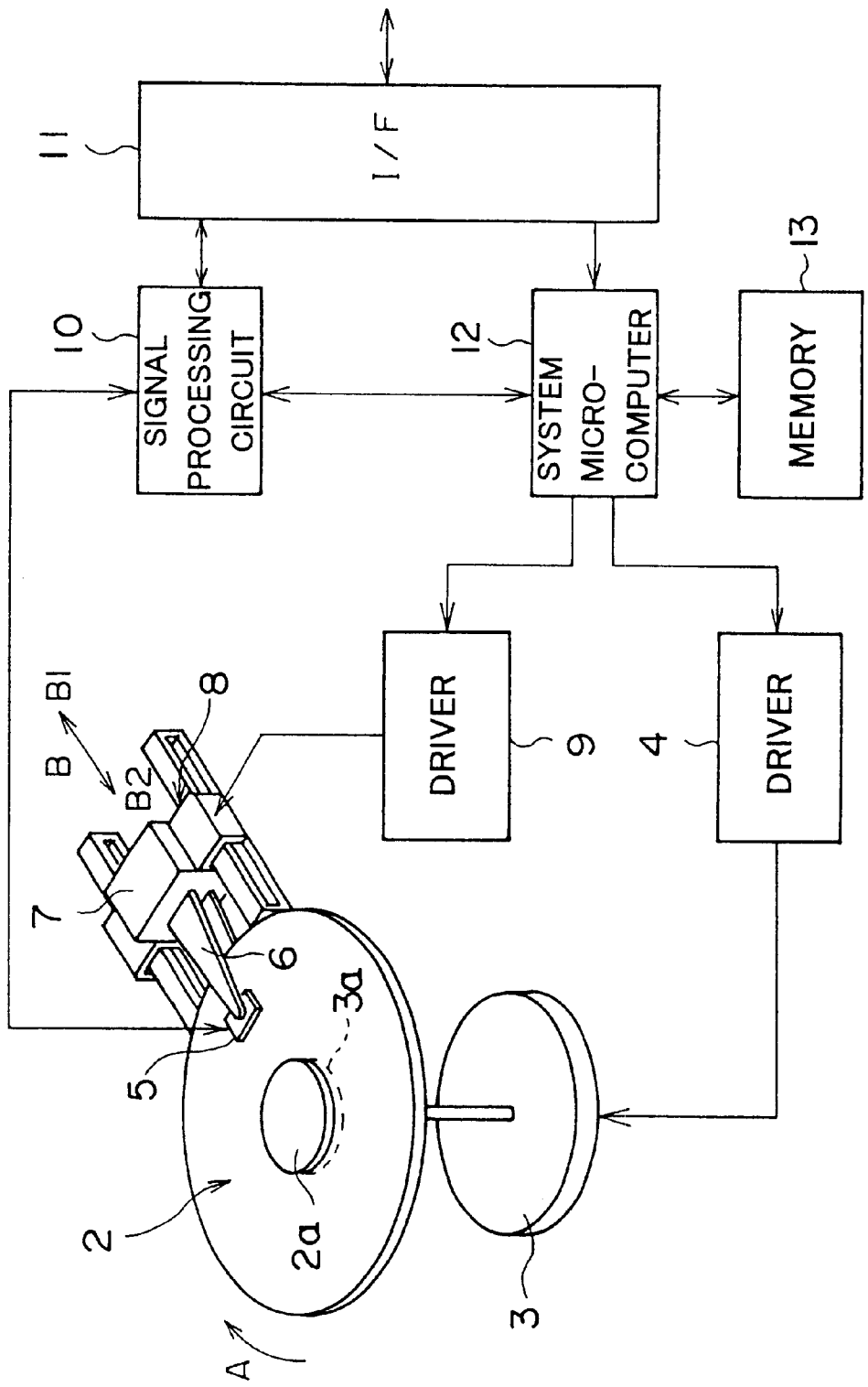
FIG. 1 is a block diagram of an embodiment of the present invention.

FIG. 1 shows a block diagram of an embodiment of the present invention. As shown in the diagram, a recording medium in the form of a disk 2 on which data is magnetically stored is loaded into a disk device 1. The disk 2 may be a high density floppy disk. In a state of being loaded into the disk device 1, a chuck portion 3a provided on a rotor of a spindle motor 3 fits a hub 2a mounted at the center of rotation. The spindle motor 3 is rotated in the direction of arrow A in response to a rotation drive signal supplied from a driver 4, thus rotating the disk 2.

The recording surface of the disk 2 is positioned opposite a magnetic head 5. The magnetic head 5 is fixedly mounted at an end of a suspension arm 6. An opposite end of the suspension arm 6 is fixedly mounted on a head carriage 7. By moving the head carriage 7 in a direction of a radius of the disk 2 the magnetic head 5 fixedly mounted at the end of the suspension arm 6 can be moved parallel to the surface of the disk 2. The head carriage 7 is fitted to an actuator 8. The actuator 8 is moved in a direction of arrow B, that is, in the direction of the radius of the disk 2 in response to a movement control signal supplied from the driver 9, thus moving the head carriage 7 in the direction of the radius of the disk 2 as well.

The magnetic head 5 is connected to a signal processing circuit 10. The signal processing circuit 10 supplies recording signals to the magnetic head 5 and demodulates reproduced signals reproduced by the magnetic head 5.

The signal processing circuit 10 is connected to an interface circuit 11 and a system microcomputer 12. The interface circuit 11 is connected between the signal processing circuit 10 on the one hand and a host computer (not shown in the diagram) on the other, and functions as an interface between the signal processing circuit 10 and the host computer.

The system microcomputer 12 is connected to the signal processing circuit 10, interface circuit 11 and memory 13. The system microcomputer 12 checks the memory 13 in response to a current position data supplied from the signal processing circuit 10 and to a target position data supplied from the interface circuit 11, and adjusts the head carriage speed to a speed profile stored in the memory 13. Additionally, the system microcomputer 12 adjusts the position of the head carriage in response to tracking error signals supplied from the signal processing circuit 10.

Two modes are programmed into the system microcomputer 12, to be accessed as appropriate: A speed control mode for controlling, that is adjusting, the speed of movement of the head carriage 7, and a position control mode for controlling, that is adjusting, the position of the head carriage 7. The system microcomputer 12 detects the output from the servo system integrator in the position control mode just prior to commencing a seek operation and selects an optimum target speed profile depending on the size and polarity of that output, adjusting the seek speed accordingly.

Figure 2:
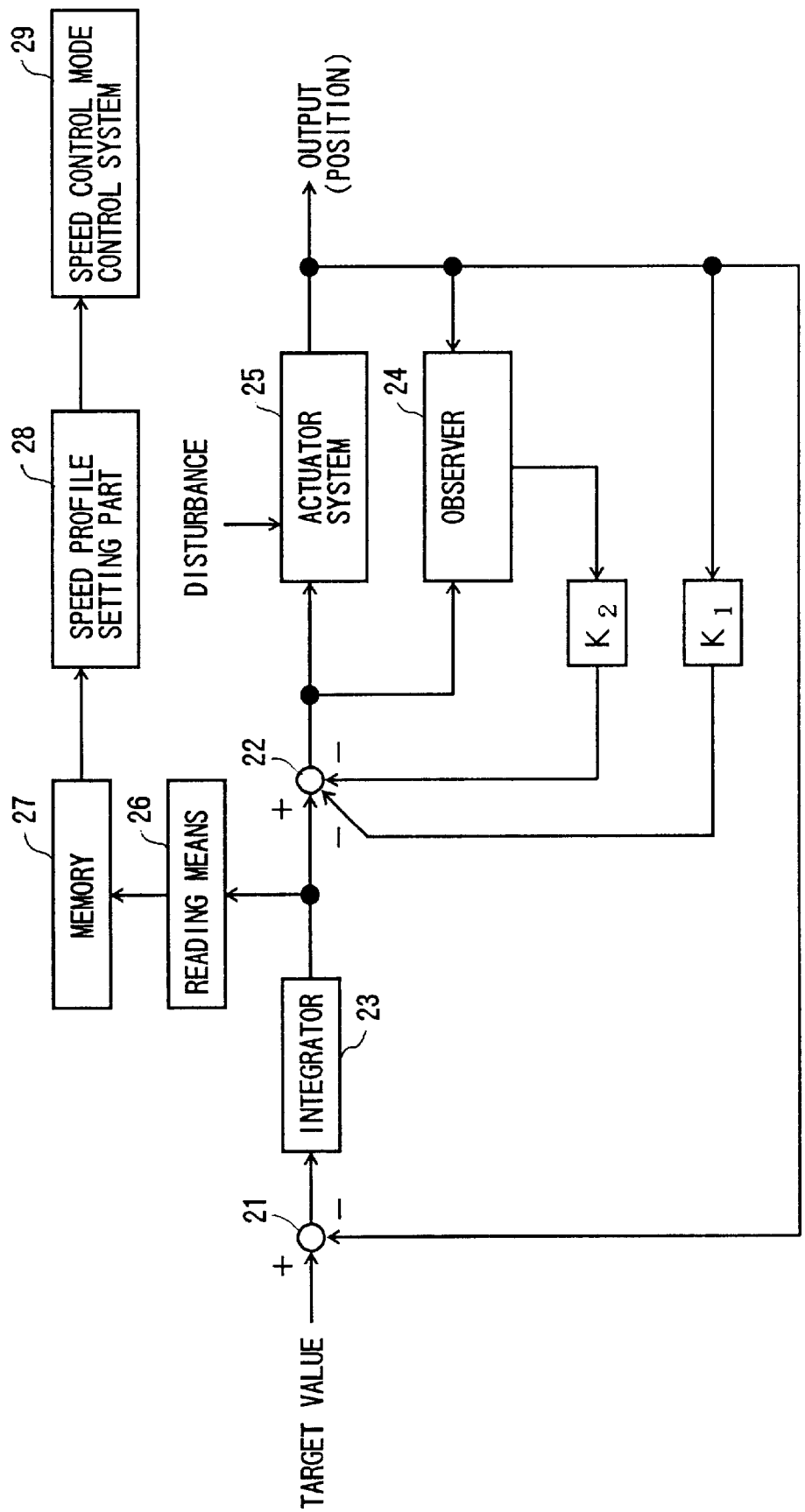
FIG. 2 is a block diagram of a control system of an embodiment of the present invention.

A description will now be given of the system microcomputer 12 by reference to FIG. 2. FIG. 2 is a block diagram of a control system of an embodiment of the present invention.

The position control mode system comprises an integrator 23 and an observer 24, and controls the driving of an actuator system 25.

A target value indicating a target tracking position supplied from the interface circuit 11 and current position data supplied from the magnetic head 5 via the signal processing circuit 10 are supplied to a first summing point 21. The difference between the target position and the current position is detected at the first summing point 21 and the value thus obtained is supplied to the integrator 23. The integrator 23 integrates the values detected at the first summing point 21 and outputs integrated values that are then supplied to a second summing point 22. To this second summing point 22 are supplied the integrated values supplied from the integrator 23, a status estimated amount, that is, an estimated head carriage speed, supplied from the observer 24 and multiplied by a feedback gain vector value K2, and the head carriage position data multiplied by a feedback gain vector value K1, and an output for each is calculated.

The calculated value generated at the second summing point 22 is supplied both to the driver 9 via the actuator 8 and to the observer 24. The reproduced signal reproduced by the magnetic head 5 is demodulated by the signal processing circuit 10, obtaining both position data and reproduced data. It should be noted that the magnetic head 5, the actuator 8, the driver 9 and the signal processing circuit 10 correspond to the actuator system 25.

The actuator system 25 obtains reproduced data as well as current position data from the address of the reproduced data and the tracking error signals. The current position data is multiplied by the feedback gain vector value K1 and supplied to the summing point 22 as well as to the observer 24 and the summing point 21. At the observer 24, an estimated speed based on the comparative value from the summing point 22 and the position data from the actuator system 25 is generated and that estimated speed is multiplied by the feedback gain vector value K2 and supplied to the summing point 22.

The speed control mode system comprises reading means 26, a memory 27, a speed profile setting part 28 and a speed control mode control system 29.

The reading means 26 reads the integrated value output from the integrator 23 at a time when the magnetic head 5 is tracking properly and stores the size and polarity of the integrator 23 output values in the memory 27. The integrated value of the integrator 23 becomes a signal that corresponds to the load of a direct current component on the head carriage 7 in the direction of the seek when the head carriage 7 is tracking properly in the position control mode.

It should be noted that when the speed of movement of the head carriage 7 is adjusted the detected value stored in the memory 27 is supplied to the speed profile setting part 28. When the head carriage 7 is seeking a target track, the speed profile setting part 28 compares the detected value stored in the memory 27 to a standard value. The speed profile setting part 28 transmits the speed profile data selected depending on the results of that comparison to the speed control mode control system 29.

Figure 3:
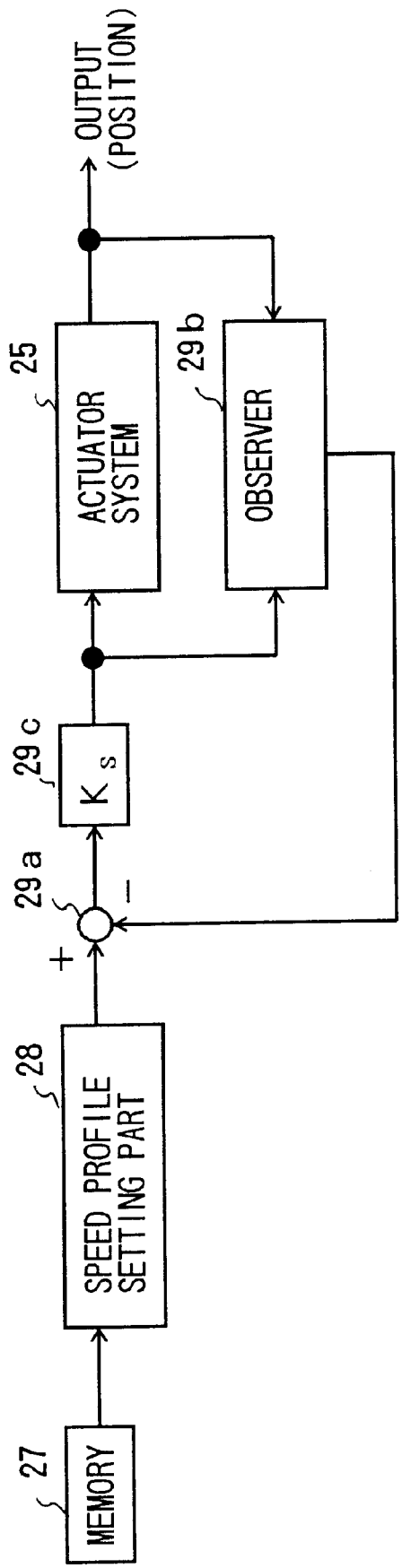
FIG. 3 is a block diagram of a speed control mode of an embodiment of the present invention.

FIG. 3 is a block diagram of a speed control mode of an embodiment of the present invention. As shown in the diagram, speed profile data supplied from the speed profile setting part 28 and the estimated speed of the head carriage 7 as supplied from the observer 29*b* is supplied to a summing point 29*a*, where each output is calculated. The output of the summing point 29*a* is supplied to a multiplier 29*c*, where the summed value supplied from the summing point 29*a* is multiplied by a gain constant Ks and supplied to the actuator 25 as well as the observer 29*b*.

In the position control mode, when the magnetic head 7 is on track the direct current component of a force F exerted on the head carriage 7 in the direction of the seek, that is, a disturbance value, and the servo system integrator output, are in balance.

Accordingly, by detecting the output of the integrator 23, the size and direction of the direct current component of the disturbance F can be known. As a result, when a disturbance value is detected just prior to beginning seek in the position control mode and this detected value exceeds a permissible range, then a speed profile appropriate to the detected value can be selected.

A plurality of speed profiles having differing values of negative acceleration during deceleration are available, so a speed profile having a negative acceleration during deceleration that is appropriate to the detected value is selected and the speed of the head carriage set.

A description will now be given of the control processes performed by the system microcomputer, with reference to FIG. 4.

Figure 4:
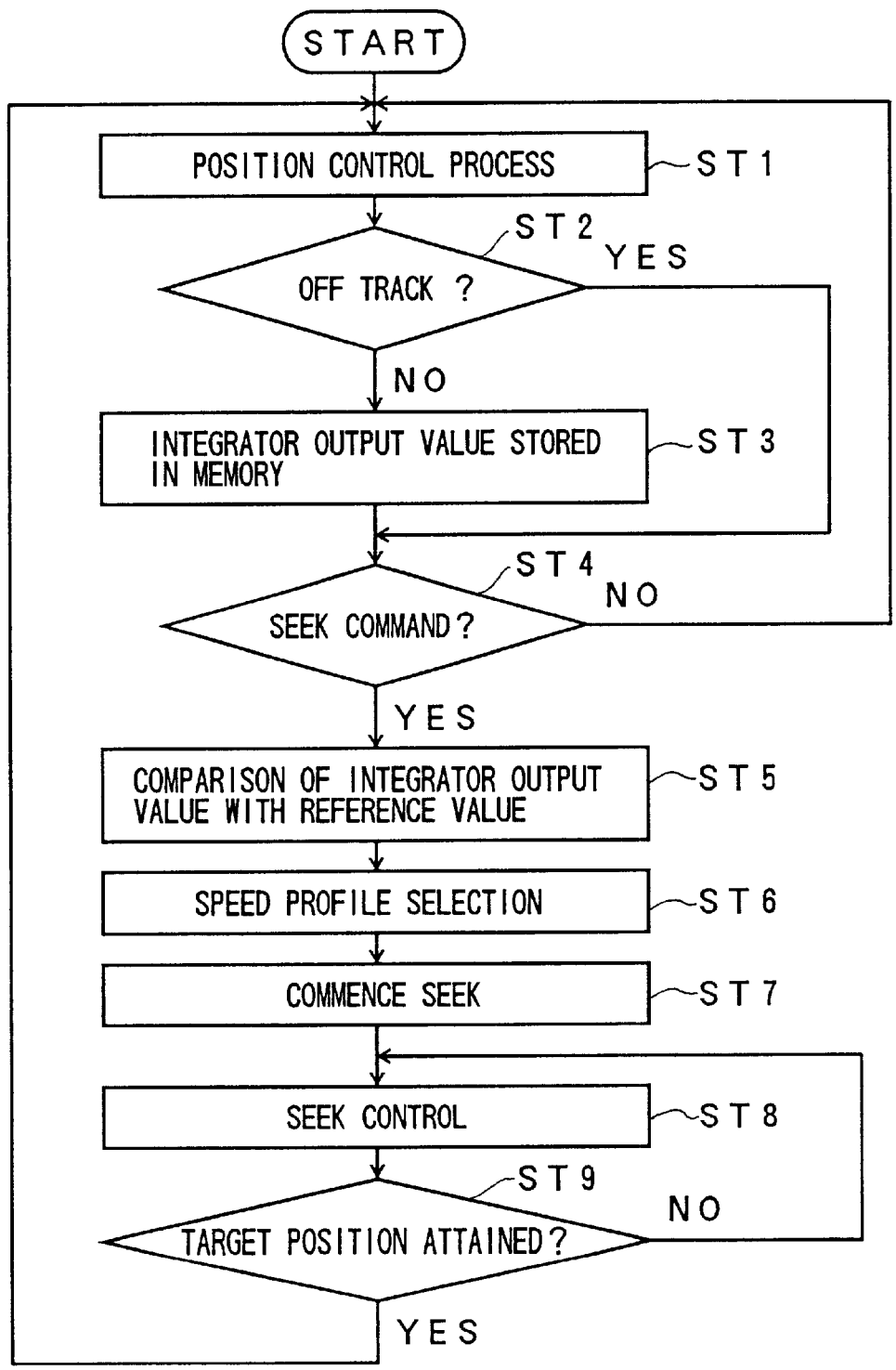
FIG. 4 shows a flow chart of the control processes performed by the system microcomputer of an embodiment of the present invention.

FIG. 4 shows a flow chart of the control processes performed by the system microcomputer of an embodiment of the present invention.

In a step ST1, in the position control mode the system microcomputer controls the position of the head carriage 7, that is, controls the magnetic head 5 tracking so that the magnetic head 5 accurately traces the scan track. While the system microcomputer is controlling the position of the magnetic head 5 it is also constantly monitoring the magnetic head 5 to determine in a step ST2 whether or not the magnetic head 5 is off track and to determine in a step ST4 whether or not a seek command has been issued.

If in step ST2 it is determined that the magnetic head 5 is off track and it is determined in a step ST3 that no seek command has been issued, then the system microcomputer returns to step ST1. However, if in step ST2 it is determined that the magnetic head 5 is on track, then in step ST3 the system microcomputer reads the integrator output to the memory.

It should be noted that an integrator output value already stored in the memory will be overwritten. In step ST4, after issuance of a seek command has been confirmed, the integrator output value stored in the memory is compared to a reference value in a step ST5. Based on the results of the comparison performed in step ST5 an optimum speed profile for the operating environment at that time is selected in a step ST6 and, in a step ST7, a seek operation is commenced. In a step ST8, the seek operation is performed in accordance with the speed profile selected until attaining a target track, that is, a target position in a step ST9. Thereafter the system microcomputer 12 switches to the position control mode and the process returns to step ST1.

A description will now be given of a method for selecting the speed profile, in particular a method for selecting an optimum target speed profile based on the detected output of the integrator, with reference to FIG. 5 and FIG. 6.

The present embodiment has, for example, two target speed profiles for the negative acceleration during deceleration of the head carriage 7: One for a negative acceleration α dt in a normal state, in which no additional force in the direction of the seek is anticipated, and another for a negative acceleration αdm in a state in which additional force in the direction of the seek is anticipated.

Figure 5:
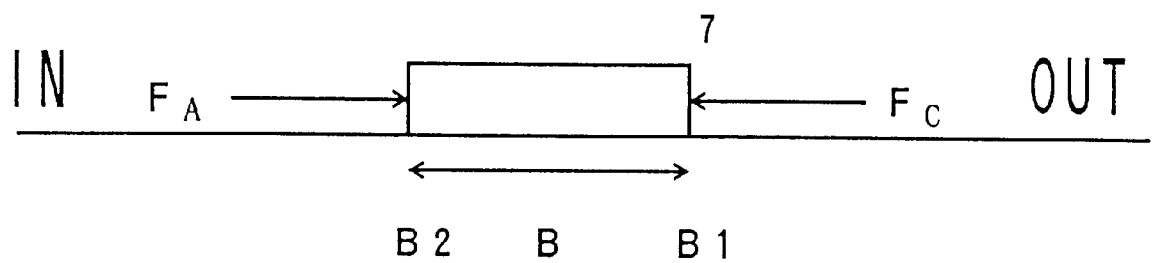
FIG. 5 is a diagram showing a state in which a force is applied in the direction of the seek.
Figure 6:
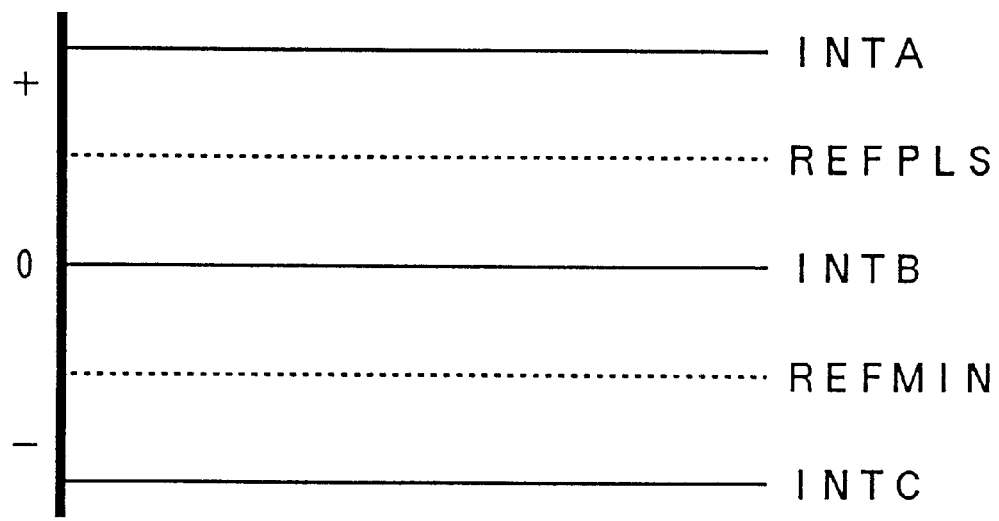
FIG. 6 is a diagram for explaining the operation of an embodiment of the present invention.
Figure 7:
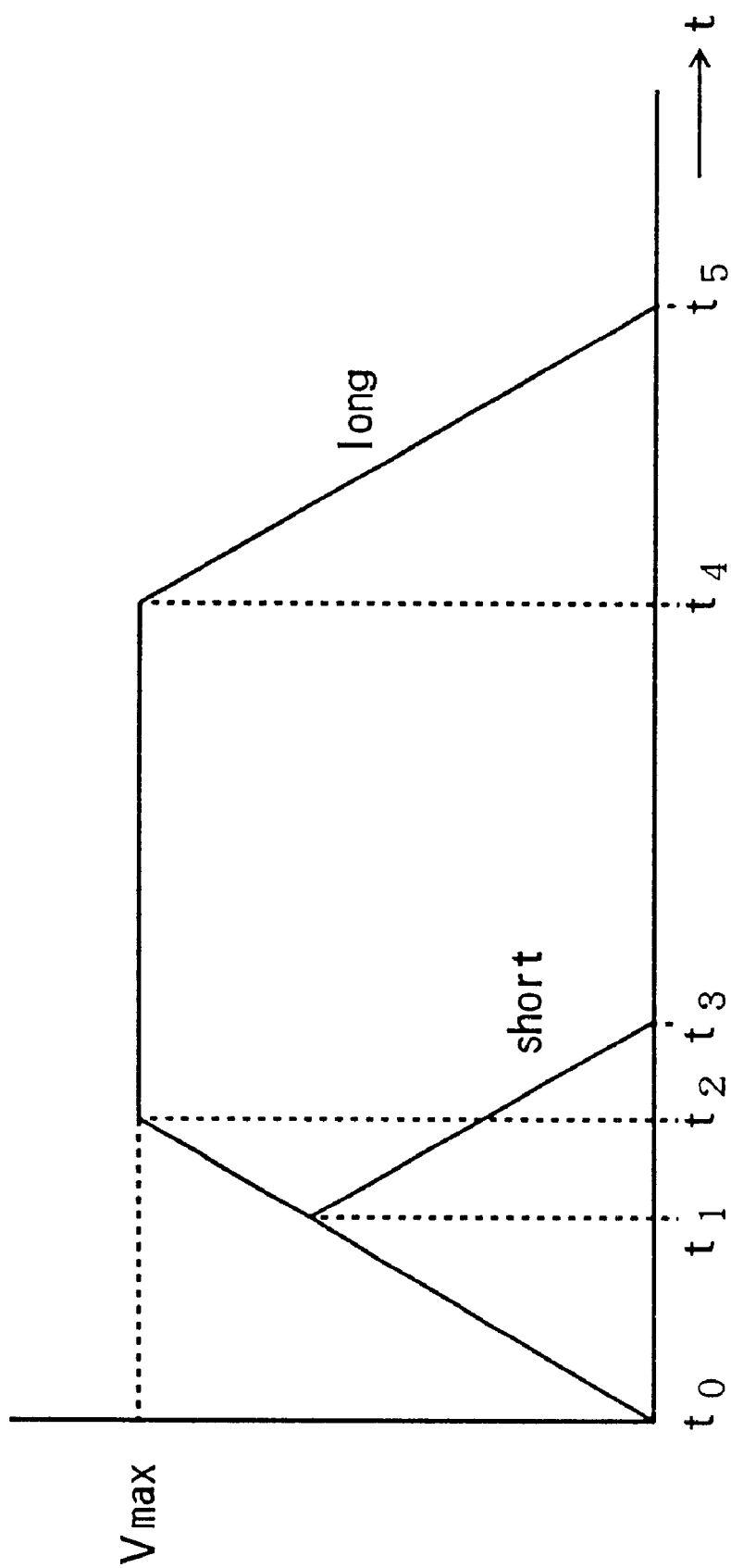
FIG. 7 shows an example of speed profile characteristics.
Figure 8:
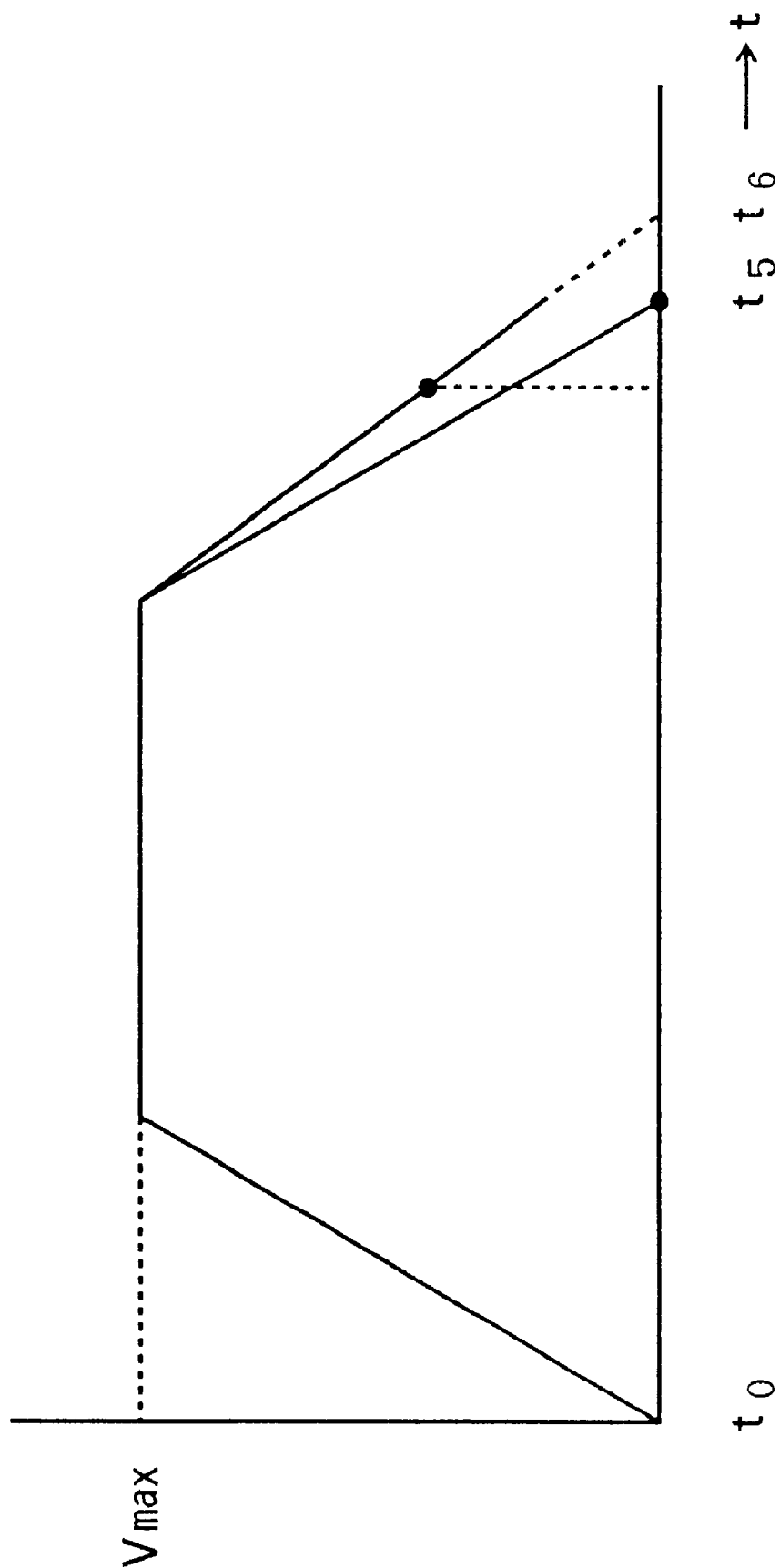
FIG. 8 shows an example of speed profile characteristics.
Figure 9:
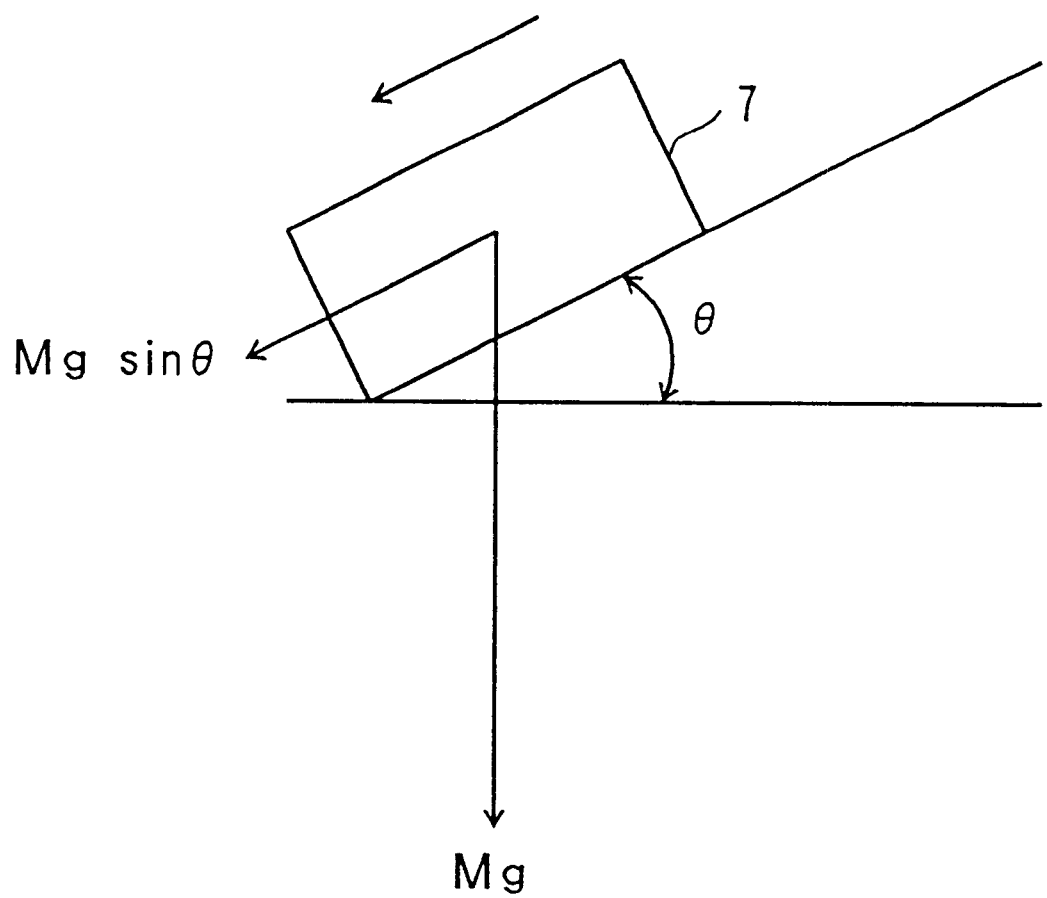
FIG. 9 is a diagram for describing a horizontal dispersion of force when the disk device is tilted.

FIG. 5 shows a state in which a force, that is, a disturbance, is applied in the direction of the seek. IN indicates a direction toward an inner periphery of the disk and OUT indicates a direction toward an outer periphery of the disk. In FIG. 5, the absence of a force applied against the head carriage 7 in the direction of the seek, that is, in the B direction, is an indication that the control system has not been affected by a disturbance. As a result, the memory 27 output is a value that approaches zero, as for example shown by the level INTB shown in FIG. 6, and thus falls between the two reference values shown as REFPLS and REFNIN. That is, when the output of the memory 27 speed profile setting part 28 is between the reference values it is deemed that no large force is being applied against the head carriage, that is, no disturbance is affecting the head carriage. Accordingly, the speed profile set for an acceleration α dt in a normal state is selected for deceleration of the head carriage during seek.

Additionally, if, for example, the disk drive is itself tilted toward the outer periphery of the disk 2, that is, in the direction of arrow B1 as shown in FIG. 5 and a disturbance is applied against the head carriage 7 in the direction of the outer periphery of the disk 2, that is, in the direction of arrow B1, then the control system will be affected by a disturbance force FA. Accordingly, the output of the memory 27 will be at a level shown as INTA in FIG. 6, with INTA being greater than REFPLS. With INTA being greater than a positive reference value REFPLS the speed profile setting part 28 determines that the force FA of a disturbance exceeds a standard level and, accordingly, the speed profile set for an acceleration αdm is selected for deceleration of the head carriage during seek.

It should be noted that, in the situation described above, during deceleration of a seek in the direction of the inner periphery of the disk 2 the selected speed profile is the speed profile set with a negative acceleration αdm, whereas during deceleration of a seek in the direction of the outer periphery of the disk 2 the selected speed profile is the speed profile set with a negative acceleration αdt.

It should be noted that, in the situation described above, during deceleration of a seek in the direction of the outer periphery of the disk 2, that is, in the B1 direction, the selected speed profile is the speed profile set with a negative acceleration αdm, whereas during deceleration of a seek in the direction of the inner periphery of the disk 2, that is, in the B2 direction, the selected speed profile is the speed profile set with a negative acceleration αdt.

Similarly, if, for example, the disk drive is itself tilted toward the inner periphery of the disk 2, that is, in the direction of arrow B2 as shown in FIG. 5 and a disturbance is applied against the head carriage 7 in the direction of the inner periphery of the disk 2, that is, in the direction of arrow B2, then the control system will be affected by a disturbance force Fc. Accordingly, the output of the memory 27 will be at a level shown as INTC in FIG. 6, with INTC being less than REFMIN. With INTC being less than a negative reference value REFMIN the speed profile setting part 28 determines that the force FC of a disturbance exceeds a standard level and, accordingly, the speed profile set for an acceleration αdm is selected for deceleration of the head carriage during seek.

It should be noted that, in the situation described above, during deceleration of a seek in the direction of the inner periphery of the disk 2, that is, in the B2 direction, the selected speed profile is the speed profile set with a negative acceleration αdm, whereas during deceleration of a seek in the direction of the outer periphery of the disk 2, that is, in the B1 direction, the selected speed profile is the speed profile set with a negative acceleration αdt.

According to the embodiment of the present invention as described above, it is possible to select a speed profile appropriate to a disturbance exerting a force on the head carriage 7 of the disk device without the use of specialized means for detecting such a disturbance, thus simplifying the structure of the disk device and making it possible to accurately control and adjust the speed of movement of the head carriage 7 despite disturbance.

Additionally, it should be noted that although the speed profile can be chosen from among a plurality of preset speed profiles, it is also possible to calculate a speed profile appropriate to a disturbance to be used during a seek operation. By calculating the speed profile from a disturbance the necessity of storing a plurality of speed profiles in memory is eliminated.

The above description is provided in order to enable any person skilled in the art to make and use the invention and sets forth the best mode contemplated by the inventor of carrying out his invention. The present invention is not limited to the specifically disclosed embodiments and variations, and modifications may be made without departing from the scope of the present invention.

The present application is based on Japanese priority application No. 10-89749 filed on Apr. 2, 1998, the entire contents of which are hereby incorporated by reference.

What is claimed is:

1. A disk device comprising:

a head for recording and reproducing data to and from a disk-shaped recording medium;

a carriage for supporting the head;

drive means for moving the carriage in the direction of a radius of the recording medium;

control means for controlling the drive means based on a speed profile;

reading means for providing an integrated value produced from a difference between positional data of a target tracking position and positional data of a current position supplied from the head during a tracking control, to detect a disturbance imparted to the carriage, from the integrated value; and speed profile setting means for setting the speed profile, before starting a speed control, to be used during the speed control by the control means, based on the distrubance detected when the head is positioned above the target track.

2. The disk device as claimed in claim 1, the control means comprising:

a comparator for comparing the positional data of the current position supplied from the head with the positional data of the target tracking position; and an integrator for integrating an output value of the comparator to produce the integrated value from the difference between the positional data of the target tracking position and the positional data of the current position, wherein the reading means detects the output value of the integrator as a disturbance imparted to the carriage.

3. The disk device as claimed in claim 2, wherein the reading means comprises a memory for storing the output value of the integrator when the head is positioned above the target track.

4. The disk device as claimed in claim 3, wherein the speed profile setting means generates and sets a speed profile based on the value stored in the memory.

5. The disk device as claimed in claim 3, wherein the speed profile setting means compares the value stored in the memory with a predetermined standard value and depending on the results of that comparison selects a corresponding speed profile from among a plurality of preset speed profiles.

* * * * *